No. 808,291. PATENTED DEC. 26, 1905.
G. C. MACKROW & H. G. CAMERON.
DEVICE FOR DETACHING LOADS FROM ELEVATORS, &c.
APPLICATION FILED FEB. 4, 1905.
6 SHEETS—SHEET 1.
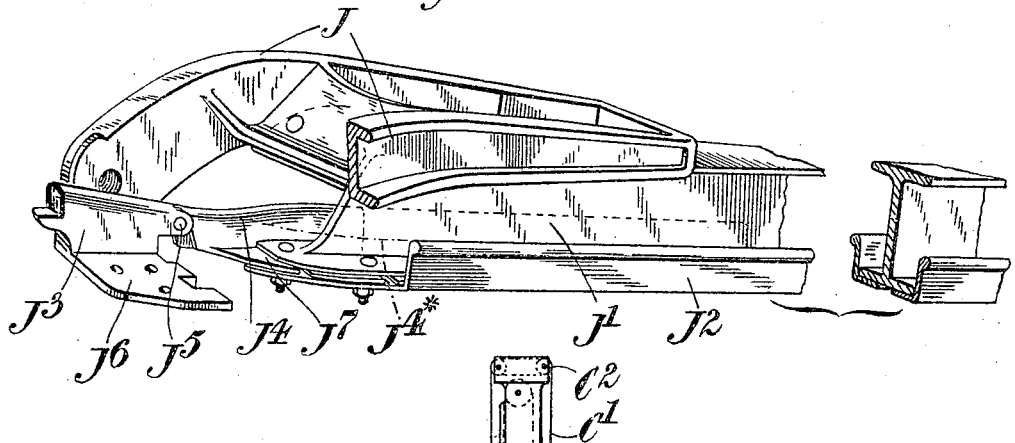
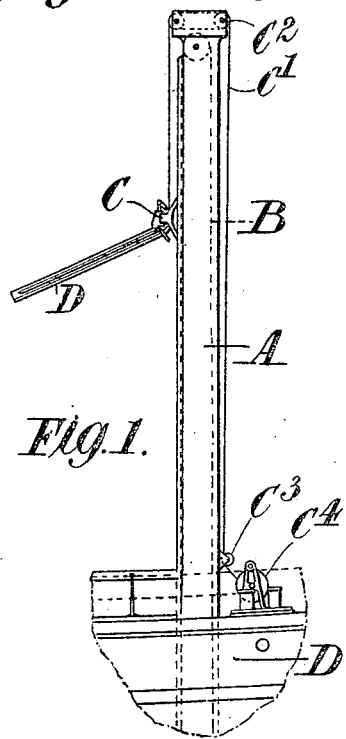
Witnesses
Thomas Durant
M. W. Church
Inventors:
George C. Mackrow
Herbert G. Cameron
by Church & Church
their attys.

No. 808,291. PATENTED DEC. 26, 1905.
G. C. MACKROW & H. G. CAMERON.
DEVICE FOR DETACHING LOADS FROM ELEVATORS, &c.
APPLICATION FILED FEB. 4, 1905.
6 SHEETS—SHEET 2.
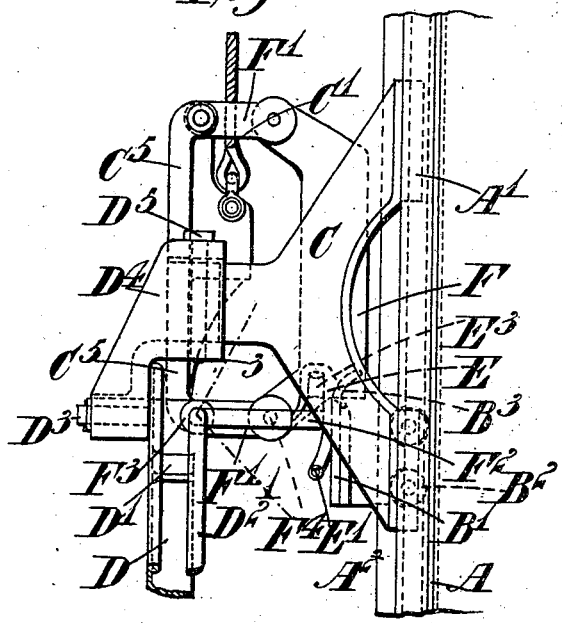
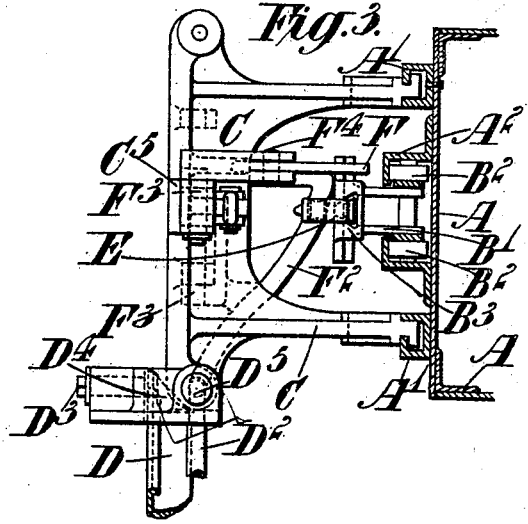
Witnesses:
Thomas Durant
M. D. Church
Inventors:
George C. Mackrow
Herbert G. Cameron
by Church & Church
their attys.

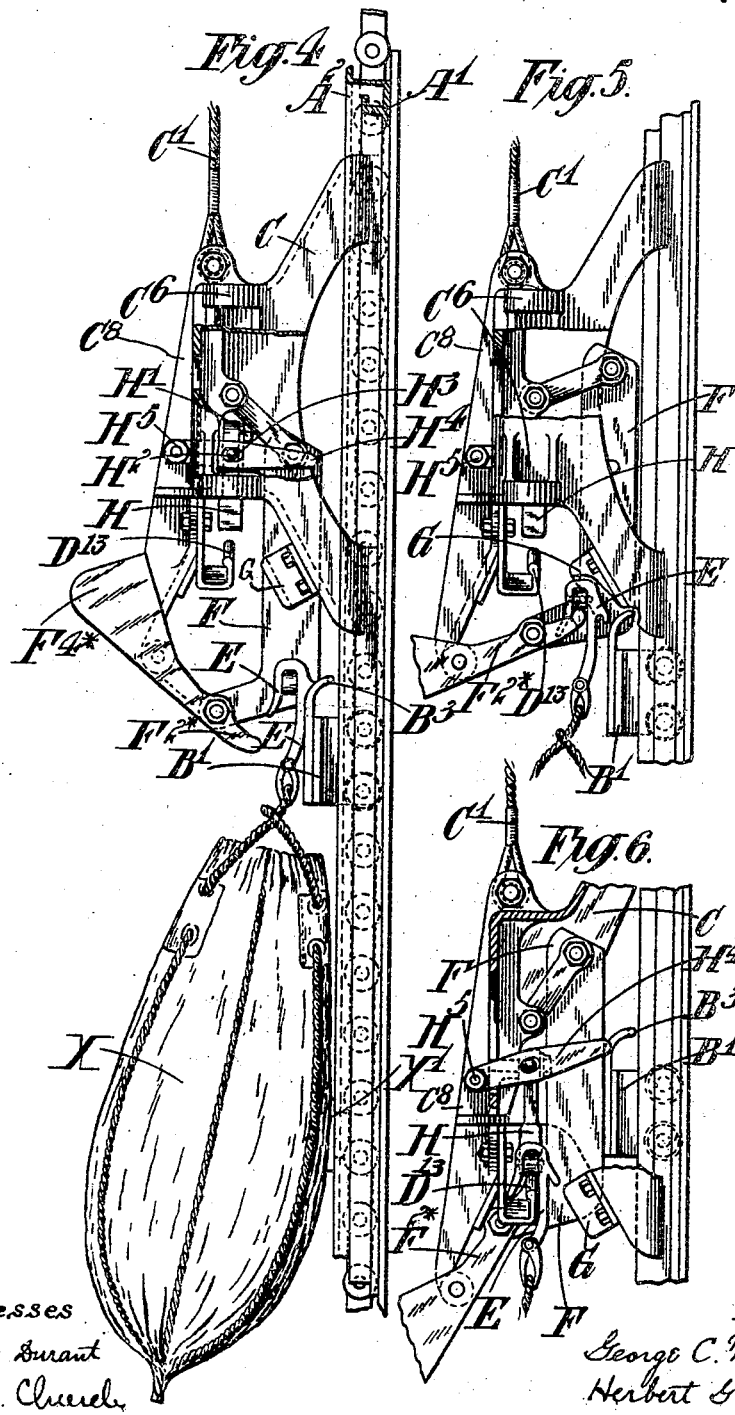

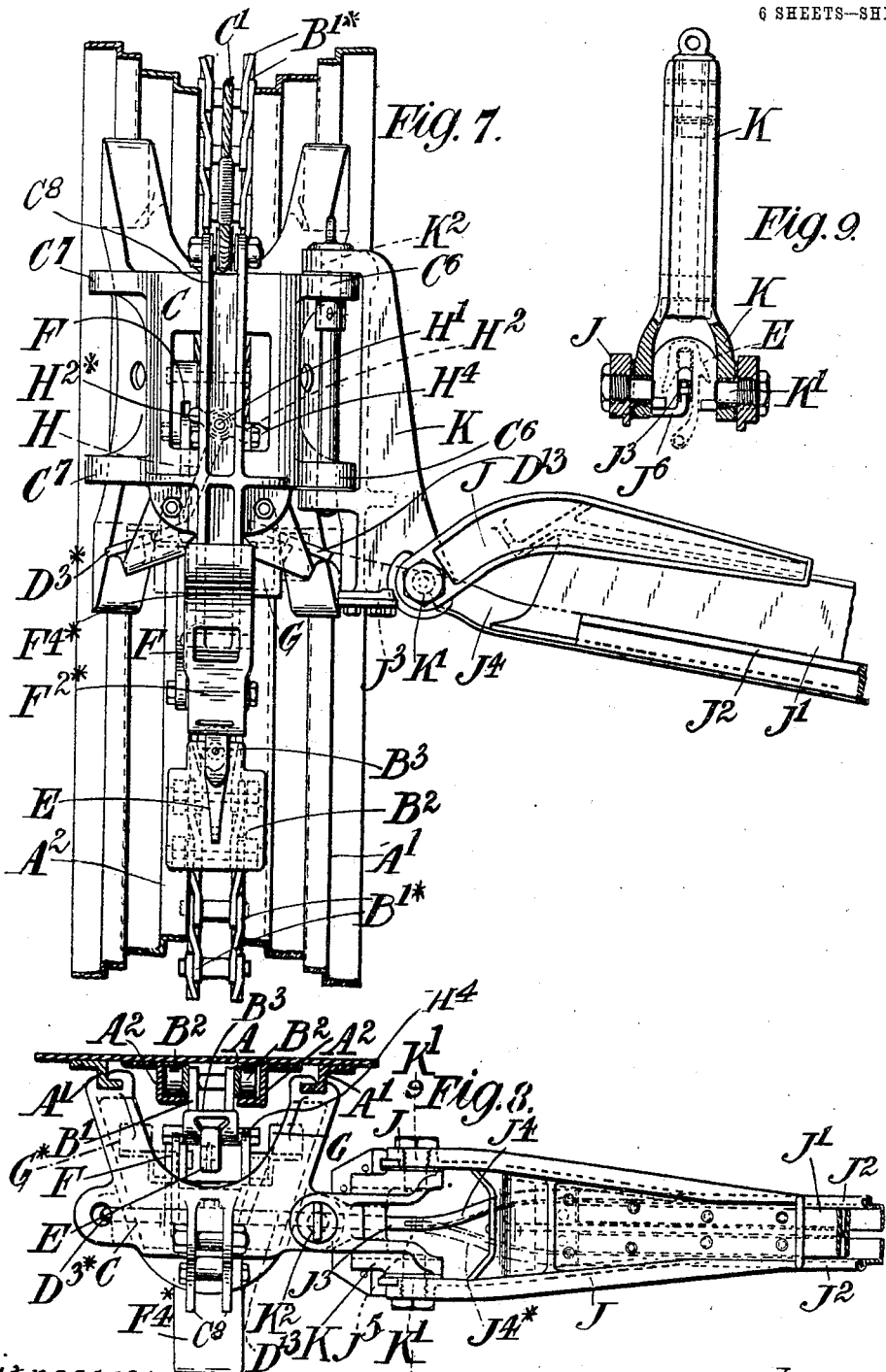

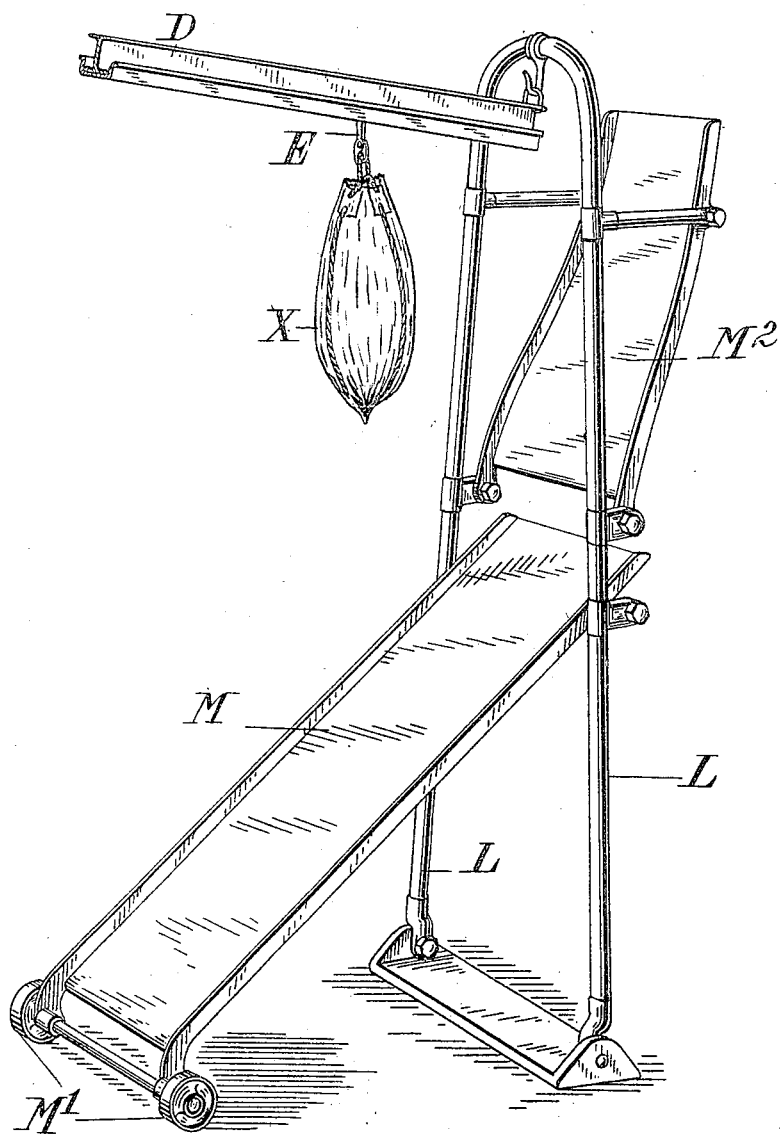

No. 808,291. PATENTED DEC. 26, 1905.
G. C. MACKROW & H. G. CAMERON.
DEVICE FOR DETACHING LOADS FROM ELEVATORS, &c.
APPLICATION FILED FEB. 4, 1905.

6 SHEETS—SHEET 6.

Witnesses
Thomas Durant
Melville D. Church

Inventors:
George C. Mackrow 2nd
Herbert G. Cameron
by Church & Church
their attys.

UNITED STATES PATENT OFFICE.

GEORGE COLBY MACKROW AND HERBERT GEORGE CAMERON, OF LONDON, ENGLAND.

DEVICE FOR DETACHING LOADS FROM ELEVATORS, &c.

No. 808,291. Specification of Letters Patent. Patented Dec. 26, 1905.

Application filed February 4, 1905. Serial No. 244,242.

*To all whom it may concern:*

Be it known that we, GEORGE COLBY MACKROW and HERBERT GEORGE CAMERON, subjects of the King of England, residing at London, England, have invented certain new and useful Improvements in or Relating to Devices for Detaching Loads from an Elevator or the Like, of which the following is a specification.

This invention relates to improvements in devices for detaching loads from an elevator or the like, and has for its main objects (a) to provide means by which the loads may be automatically released from a continuously-traveling hoist at the desired point, (b) to provide apparatus for depositing the loads when released, and (c) to provide means by which the point of release may be varied, if desired.

The apparatus is particularly adapted for unloading cargo, such as coal, from one craft and delivering to another, and in the following description will be referred to in that connection, although it may be equally well used for loading craft from a wharf or for transporting goods from one point to another, whether at the same or different levels.

Figure 12:
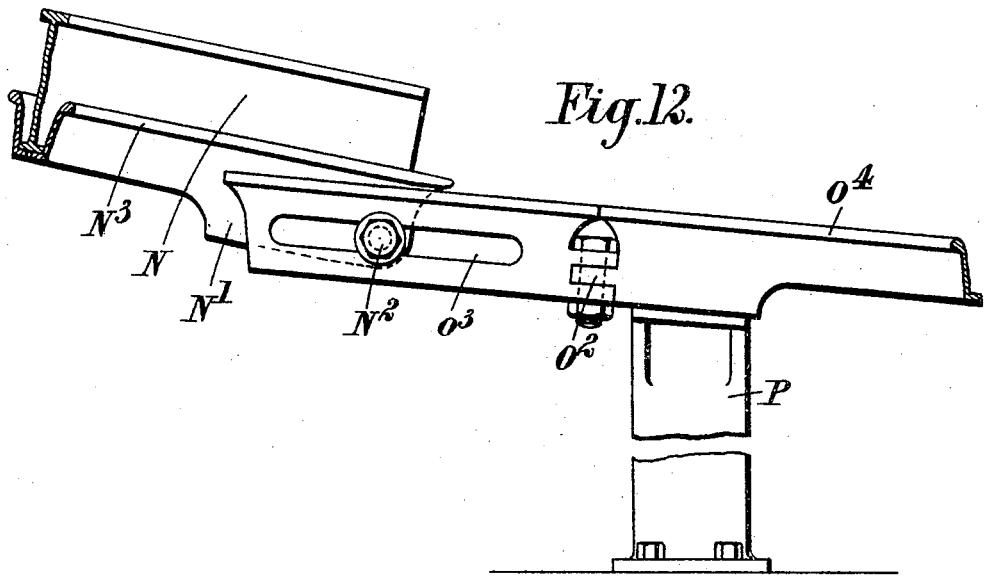
Figure 13:
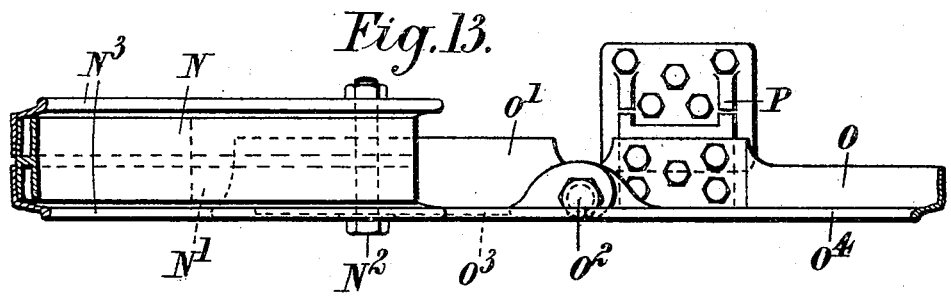

In the accompanying drawings, Figure 1 shows in elevation the main portion of the apparatus constructed according to one method of carrying out this invention. Fig. 2 is a side elevation of the detaching portion of the mechanism on an enlarged scale. Fig. 3 is a plan of the same. Fig. 4 is a side elevation of a modified form of detaching mechanism. Figs. 5 and 6 are similar views to Fig. 4 with the parts in different positions. Fig. 7 is a front elevation of the detaching device with the delivery-runner attached. The elevator is shown in this figure in a slightly-different position for the sake of clearness. Fig. 8 is a plan of the same. Fig. 9 is a vertical section through the delivery-runner on the line 9 9 of Fig. 8. Fig. 10 is a perspective view, on an enlarged scale, of one end of the delivery-runner. Fig. 11 is a diagrammatic perspective view of a device for checking the detached loads. Fig. 12 is a diagrammatic view of a detail of the invention in elevation, and Fig. 13 is a plan of the same.

Like letters indicate like parts throughout the drawings.

Referring first to Figs. 1 to 3, an upright A supports a continuously-traveling elevator or conveyer (indicated at B) and is mounted on the collier or other craft to be unloaded. A portion of the collier is shown at D. The upright A is of sufficient length to project above the deck or a suitable port in the side of the craft to be loaded, and on one side carries angle or guide plates A'. These plates form guideways up the face of the support, which engage suitably-shaped ends or feet of a sliding frame C. The frame is supported by a wire rope C', conveniently passed over pulleys $C^2$ at the top of the support A and under a pulley $C^3$ at the bottom of the support, whence it passes to a windlass $C^4$. By winding a greater or smaller quantity of the hawser upon the windlass the position of the frame C upon the support A can be adjusted.

Pivoted to the frame C, so that it can swing about both vertical and horizontal axes, is a delivery-guide D, hereinafter described in detail. The free end of this rail is intended to rest upon the deck of the craft to be loaded, or inserted through a side port or over the bulwark for the purpose of conveying the loads disconnected from the elevator to the point at which they are intended to be delivered.

The conveyer is of the chain type and comprises, preferably, a series of links B' in the form of trolleys, having wheels or rollers $B^2$, which engage vertical guideways $A^2$, secured to the support A between the guides A'. These links, which may be called "carrying-links," project beyond the guides $A^2$ and are provided at their upper ends with backwardly-curved loops or eye pieces $B^3$.

The load to be carried is connected to the elevator by a double hook E, one arm of which is passed through the eye $B^3$, and thus engages the carrying-link B'. The load is attached to the shank E' of the hook, as shown at X in Fig. 4, and the second arm projects in a direction away from the elevator and has mounted in it a roller $E^3$. The carrying-links are preferably separated by an interval sufficiently great to prevent the load carried by one link from overlapping the link below it and are connected by any suitable plain links—such as B'*, Fig. 7—to complete the chain. Between the carrying-links a buffer-link X', Fig. 4, is inserted. This may be of any construction, provided it projects beyond the guide-rails $A^2$, so that the load rests against it and is thus kept clear of the rails.

The detaching mechanism carried by the frame C comprises a striking-plate F, pivoted by links F' to suitable brackets C⁵ on the frame C. The plate F lies in a vertical plane with one edge parallel to the elevator B and is free to rise and fall by a parallel motion controlled by the links referred to. The lower link F' is provided with an extension or arm F², constituting, together with the link, a load-lifting member. The arm extends back obliquely from the link to a point in line with the pivot about which the link swings, and the two members normally lie in the plane indicated by the chain-line 1, Fig. 2, so that its free end lies clear of the hook E and allows this to pass as it is raised by the elevator. One end of the link F', carrying the extension or load-lifting member F², projects beyond the point F⁴, at which it is pivoted to the plate F, but is of such length that when extended horizontally the load-lifting member still clears the carrying-links B', but the striking-plate F lies normally in the path of the carrying-links.

The delivery-guide comprises a support D of angle metal, Figs. 2 and 3, and a guide-rail D², carried thereon by brackets D'. The rail is carried upon a horizontal pivot D³, supported by a bracket D⁴, carried by a vertical pivot D⁵ on the frame C. The end of the rail D² lies beneath the vertical pivot D⁵ and in line with the horizontal pivot D³, where it meets the oblique portion of the arm F². It will thus be seen that the delivery-rail can rise and fall about a horizontal axis and also turn about a vertical axis without being carried away from its proximity to the end of the oblique portion of the arm F².

The operation of this device is as follows: The loads may be attached by hand to the carrying-links at the lower end of the elevator by means of the double hooks and rise with the elevator until the projecting portion of the link comes into contact with the lower edge of the striking-plate F. In Fig. 4 the position of the striking-plate is shown before displacement by the load-carrying link. In Fig. 2 the link has raised the striking-plate slightly, and in so doing has swung the arm F² from the chain-line 1 to the horizontal position, in which it is shown in full lines. Further upward movement of the elevator cause the link to carry the plate F still higher, and in so doing the arm is finally made to assume the position indicated by the chain-line 3. As already described, the hook E can pass the arm F² when in the first position; but when the arm has been raised to the second or horizontal position its operative end lies beneath the free tongue of the hook. The plate F will obviously rise at the same speed as the elevator, and consequently the pivot F⁴, by which the arm is connected to the plate, will also rise at the same speed; but as the arm is pivoted at F³ as well as at F⁴ its free or operative end, which lies beyond the pivot F⁴, will rise faster than the elevator. The consequence of this is that during the continued upward movement of the elevator the arm or load-lifting device F² overtakes the elevator and comes into contact with the free tongue of the hook E, and thus lifts the hook, with its attached load, from the carrying-link B'. As the arm rises it also swings away from the elevator until it assumes the approximately vertical position indicated by the chain-line 3, in which the hook stands entirely clear of the elevator. When the arm is raised, its upper edge inclines downwardly from the point at which the hook rests to the guide-rail D², and as the roller E³ of the hook rests upon the arm the hook, with its load, will readily gravitate down the latter to the guide-rail D². The guide-rail can be extended any convenient distance for conveying the load away from the point at which it is detached from the elevator to the desired point of deposit. As the striking-plate F is raised it also moves back under the control of the links F' until the carrying-link B' can pass. The plate is then maintained in its raised position by its front edge bearing against the link during which time the load is discharged down to the guide-rail D². The link then clears the plate and this drops back under the action of gravity to its normal position with the arm F² pendent in the position marked 1, Fig. 2. The striking-plate is shown in its raised position with the link passing it in Fig. 6.

It will be seen that the load-detaching member F² constitutes a reciprocating arm moved in one direction by the coöperation of the links of the elevator with the plate F and in the other direction by the action of gravity when the plate F is released.

By carrying the whole of the detaching mechanism and also one end of the delivery-guide D on the frame C loads can be detached from any point during the travel of the elevator, according to the position in which the frame is set. It will thus be seen that as one craft rises and the other falls during the transport of the load the incline of the delivery-rail can be instantly adjusted by shifting the frame C accordingly. Also movement between the two craft is permitted by the double pivoting of the delivery-rail to the frame C. The ready adjustment of the detaching-gear at any position along the elevator is an important feature of this invention.

In Figs. 4 to 10 a modified construction of detaching mechanism and delivery-guide is shown. In this construction the triangular load-lifting arm F² is dispensed with and a straight arm F²* employed in its stead, pivoted, as before, to the frame and the striking-plate F. Its operative end is stirrup-shaped to receive the free tongue of the hook E, so that lateral movement of the hook is prevented as it is lifted by the arm. The hook is shown engaged with the arm in this manner in Fig. 5; but when the arm comes to the vertical position, as shown in Fig. 6, it will be seen that the hook is free from the stirrup. To prevent lateral displacement of the hook as it is freed and preparatory to the arm arriving at the position shown in Fig. 6, a guide-plate G is secured to the frame C and prevents movement of the hook in one direction, while the plate F prevents its displacement in the other direction. When the arm is in the position shown in Fig. 6, it will be seen that the hook is free of the guide-plate G, so that it can be discharged from the arm $F^{2*}$.

To prevent any hitch in the discharge of the load from the lifting-arm, such as might occur with the gravity action only, described with reference to Figs. 1 to 3, a lever H is pivoted to the frame C at $H'$ and adapted to swing across the top of the arm $F^{2*}$. The lever carries a pin $H^2$ on one side, engaged by a slot $H^3$ in a lever $H^4$, pivoted to the frame C at $H^5$. The free end of the lever H projects into the path of the carrying-links $B'$ at a convenient height above the raised position of the lower edge of the striking-plate F. It thus results that after the striking-plate has been raised to its highest point, and thus the lifting-arm $F^{2*}$ has disengaged the hook E and carried it free of the link $B'$, the continued movement of the elevator causes the link $B'$ to come into contact with the lever $H^4$, which swings the arm H about its pivot $H'$, so that its free end passes over the end of the lever $F^{2*}$ and pushes the hook E therefrom. At the side of the hook E is a fixed guide-rail $D^{13}$, which receives the hook from the arm and is inclined so that the hook travels down it to the delivery-rail. The delivery-rail is supported by a forked casting J, which supports a central girder $J'$, carrying side angle-plates $J^2$. The forked ends of the casting J are pivoted about horizontal pins $K'$, carried in a bracket or jaw K, pivoted about a vertical pin $K^2$, carried in lugs $C^6$ on the frame C. A runner $J^3$ is situated midway between the forked ends of the casting J and extends from the axis of the horizontal pivot $K'$ to the axis of the vertical pivot $K^2$. At this point it butts against the fixed guide-rail $D^{13}$, while its other end is connected by a curved rail $J^4$ with one of the side rails $J^2$. The curved rail-piece $J^4$ is pivoted to the central piece $J^3$ at $J^5$, and both of these parts are detachably mounted for the purpose hereinafter described. The rail $J^3$ is carried by a plate $J^6$, Fig. 9, bolted to the base of the bracket K, and the rail-piece $J^4$ is provided with a foot or web $J^7$, bolted to the bottom flange of the girder $J'$, Fig. 10.

Fig. 9 shows the hook E about to traverse the guide-rail $D^{13}$, whence it passes to the central rail-piece $J^3$ and by the curved rail-piece $J^4$ to the left-hand rail $J^2$.

In practice the support A is set up on the craft to be unloaded with the guide-plates $A'$ facing one end or the other of the craft, and the guide-rail is hung from one side of the frame C, as clearly shown in Fig. 8, so that it covers a considerable range on that side. If mounted upon lugs situated at the center or forward part of the frame, it is found that sufficient movement cannot be obtained for either side, so that it is preferred to provide the lugs $C^6$ to carry the delivery-runner on the side of the frame, as shown. If it is desired to deliver from the other side of the craft, it is necessary, therefore, to unship the delivery-rail and to mount it in other lugs $C^7$, provided on the opposite side of the frame C. For this purpose the various parts are made reversible, and as the hooks are always delivered onto the load-lifting arm $F^{2*}$ in the same position it is necessary to alter the runners, so that the pendent load does not foul any portion of the supports. For this purpose a second guide-rail $D^{3*}$ is provided at the side of the arm $F^{2*}$, corresponding to the guide-piece $D^{13}$, but sloping in the opposite direction. The guide-piece $J^3$ has now to be unshipped and a similar piece put in its place, but supported from the opposite side of the bracket K, and the piece $J^4$, which is left-handedly curved and is shown in full lines in Figs. 8 and 10, has to be unshipped and replaced by an oppositely-curved portion $J^{4*}$. (Shown in chain-lines.) From this it will be seen that the loads formerly delivered on the left-hand guide rail or runner $J^2$ will now be delivered on the right-hand guide-rail or runner, the delivery always taking place on the runner nearest the elevator, which always offers a clear passage for the pendent load. The lever $H^4$ is also made reversible, so that it is moved from the right hand of the web $C^8$, to which it is pivoted, Fig. 7, and pivoted on the left-hand side of the same. Also the arm H is provided with a pin $H^{2*}$ on that side to engage the slot in the lever. The arm H will thus be swung in the opposite direction from that in which it was moved before when the lever $H^4$ is raised, so that the hook E is now discharged onto the guide-rail $D^{3*}$ instead of the rail $D^{13}$. Similarly the striking-plate F is shifted from the left-hand side of the web $C^8$ to the right-hand side thereof, and a guide $G*$, corresponding to the guide-plate G, is provided on the opposite side of the frame to prevent displacement of the hook, as has already been described with reference to that plate. This reversibility of the parts is of great advantage, as it avoids the use of two separate mechanisms for feeding from opposite sides of the craft.

In the modified construction of load-detaching apparatus a counterbalance-weight $F^{4*}$ is provided on the end of the detaching-arm $F^{2*}$, so that the plate F may be controlled in its return under the action of gravity after leaving the link B'. The weight F⁴ˣ does not quite balance it, so that it still returns under gravity, but with less shock than would otherwise occur.

Referring again to the delivery runner or guide, if this latter can be inserted through a port so that its delivering end is practically level with the deck or other surface upon which the loads are to be discharged the free end can be hung from the upper part of the framework of the port by any convenient means which will allow of relative movement between the runner and its support. If, however, the delivery takes place, say, over the bulwark, so that an undesirable drop occurs between the delivery end of the runner and the deck, the framework of the runner may carry at its end a checking-plate, against which the loads strike as they leave it. Such an arrangement is shown diagrammatically in Fig. 11. The end of the runner is shown at D suspended from a pair of sheer-legs L. These carry a plate M, pivoted thereto and supported at its lower end on rollers M'. Above the plate M is a plate $M^2$, fixed to the sheer-legs. It will be seen that as the loads leave the runner D they strike the plate $M^2$ and will slide down the same and the plate M to the deck-surface. The plate $M^2$ is curved, as clearly shown, to throw the load into such a position that it will not invert as it gravitates down to the deck-surface. The sheer-legs are free to pivot about their base, and the guide is free to run backward and forward upon the rollers M', so that relative movement between the deck-surface and delivery-runner D is thus allowed.

The end of the delivery guide or runner, if desired, may communicate with a stationary extension rail or runner secured on the craft to be loaded, or if the apparatus is used on land such extension guide-rail may constitute means by which the load can be carried from the end of the delivery-guide to any convenient point of deposit. In order that the load may be automatically passed from the delivery-guide to the extension guide-rail, where the latter is carried by, say, a floating coaling-depot or other craft, so that relative movement takes place between the extension guide-rail and delivery-guide, the latter must be attached to the former by some suitable joint. Such an arrangement is shown in Figs. 12 and 13, where the guide-rail N is shown as provided with a lug N' on its under side at the delivery end. The lug is free to slide upon the base of an angle-rail O', which constitutes part of an extension-guide-rail system O. The extension system may be carried by any suitable supports, as indicated at P, and the part O' is hinged to the part O, as shown at $O^2$. The delivery-guide N is maintained in proper relative position with the part O' of the extension guide-rail by means of a bolt $N^2$, which engages a slot $O^3$ in the member O' and is secured in the lug N'. This arrangement allows the delivery guide-rail to slide backward and forward upon the part O', while the portion $N^3$ of the rail, which carries the hook, is always maintained vertically above the corresponding part $O^4$ of the extension system. It will thus be seen that a certain amount of relative movement is permitted between these parts without disturbing the automatic delivery of the loads. The extension-guide-rail system may be portably constructed or otherwise for carrying loads to various parts of the craft, according to requirements.

The checking device described for the loads is only given by way of example, as various devices may be used for this purpose, and it will also be understood that the delivery end of the runner may be supported in any convenient manner—as for instance, by suitable tackle—from the mast of the vessel to be coaled.

It will be understood that the elevator with which the detaching device is employed may take any convenient form and may be either fixed or portable.

Whatever form of conveyer is employed the load is still lifted therefrom while in motion.

What we claim as our invention, and desire to secure by Letters Patent, is—

1. In a device for detaching loads from an elevator, the combination of an elevator, means for attaching loads to the elevator, a frame adjustable relatively to any point in the path of the carrying portion of the elevator and mechanism carried by the frame for detaching the loads from the elevator at varying points according to the position to which the frame is adjusted, substantially as set forth.

2. In a device for detaching loads from an elevator the combination of, a load-carrying elevator, a frame adjustable relatively to any point in the path of the carrying portion of the elevator, mechanism carried by this frame and operating in the same direction as the elevator to lift the load therefrom as it arrives at a given position relatively to the frame, and means for connecting the elevator with such mechanism when the load is to be detached, substantially as set forth.

3. In a device for detaching loads from an elevator the combination of, a load-carrying elevator, a frame adjustable relatively to any point in the path of the carrying portion of the elevator, mechanism carried by this frame and operating in the same direction as the elevator to lift the load therefrom as it arrives at a given position relatively to the frame, and means for automatically connecting the elevator with such mechanism when the load is to be detached, substantially as set forth.

4. In a device for detaching loads from an elevator the combination of, a load-carrying elevator, a frame adjustable relatively to any point in the path of the carrying portion of the elevator, a downwardly-inclined delivery-guide attached to this frame, and mechanism carried by the frame to discharge the load from the elevator onto the delivery-guide, substantially as set forth.

5. In a device for detaching loads from an elevator the combination of, a load-carrying elevator, a support parallel with the elevator, a frame free to slide upon this support, a downwardly-inclined delivery-guide attached to the frame, means for holding the frame stationary at any point, and mechanism carried by the frame to discharge the load from the elevator onto the delivery-guide, substantially as set forth.

6. In a device for detaching loads from an elevator the combination of, a load-carrying elevator, a frame adjustable relatively to any point in the path of the carrying portion of the elevator, a downwardly-inclined delivery-guide attached to the frame, detaching mechanism carried by the adjustable frame and moved to lift the load from the elevator as it arrives at a given position relatively to the frame, means for effecting this movement by connecting the elevator operatively with such mechanism when the load is to be detached, and means for passing the load from the detaching mechanism to the delivery-guide, substantially as set forth.

7. In a device for detaching loads from an elevator the combination of, a load-carrying elevator, a frame adjustable relatively to any point in the path of the carrying portion of the elevator, a downwardly-inclined delivery-guide attached to the frame, detaching mechanism carried by the adjustable frame and operative to lift the load from the elevator as it arrives at a given position relatively to the frame, means for automatically connecting the elevator with such mechanism when the load is to be detached, and means for passing it from the detaching mechanism to the delivery-guide, substantially as set forth.

8. In a device for detaching loads from an elevator the combination of, a load-carrying elevator, a frame adjustable relatively to any point in the path of the carrying portion of the elevator, a downwardly-inclined delivery-guide attached to the frame, detaching mechanism carried by the adjustable frame and operative to lift the load from the elevator as it arrives at a given position relatively to the frame, other mechanism carried by the adjustable frame and operative to pass the load from the lifting mechanism to the delivery-guide, and means for automatically connecting both of these mechanisms with the elevator when the load is to be detached, substantially as set forth.

9. In a device for detaching loads from an elevator the combination of, a load-carrying elevator, a support near the point at which the loads are to be detached from the elevator, an arm pivoted to this support so that its operative end is free to swing into and by continued movement out of the path of the load carried by the elevator but normally lying out of such path, mechanism for connecting the elevator operatively with this arm to move it in one direction when the load is to be detached, means for multiplying the movement imparted by the elevator so that the free end of the arm overtakes the elevator, and means for returning the arm to its normal position, substantially as set forth.

10. In a device for detaching loads from an elevator the combination of, a load-carrying elevator, a support near the point at which the loads are to be detached from the elevator, an arm pivoted to this support so that its operative end is free to swing into and by continued movement out of the path of the load carried by the elevator but normally lying out of such path, mechanism for automatically connecting the elevator operatively with this arm to move it in one direction when the load is to be detached, means for multiplying the movement imparted by the elevator so that the free end of the arm overtakes the elevator, and means for returning the arm to its normal position, substantially as set forth.

11. In a device for detaching loads from an elevator the combination of, a load-carrying elevator, detaching mechanism moved to lift the load from the elevator as it arrives opposite such mechanism, a downwardly-inclined delivery-guide having its upper end situated near the point at which the load is detached, means for effecting the movement of the detaching mechanism by connecting the elevator with the same when the load is to be detached, and means for passing the load from the detaching mechanism to the delivery-guide, substantially as set forth.

12. In a device for detaching loads from an elevator the combination of, a load-carrying elevator, detaching mechanism moved to lift the load from the elevator as it arrives opposite such mechanism, a downwardly-inclined delivery-guide having its upper end situated near the point at which the load is detached, means for automatically connecting the elevator with such mechanism when the load is to be detached and means for passing the load from the detaching mechanism to the delivery-guide, substantially as set forth.

13. In a device for detaching loads from an elevator the combination of, a load-carrying elevator, detaching mechanism operative to lift the load from the elevator as it arrives opposite such mechanism, a downwardly-inclined delivery-guide having its upper end situated near the point at which the load is detached, other mechanism operative to pass the load from the lifting mechanism onto the delivery-guide and means for automatically connecting both these mechanisms with the elevator when the load is to be detached, substantially as set forth.

14. In a device for detaching loads from an elevator the combination of, a load-carrying elevator, a double hook suspended by one of its tongues from the elevator the second tongue being situated on the opposite side to the first so that it projects away from the elevator, a load-carrying shank to the hook, a detaching member adapted to be reciprocated in the path traversed by the free tongue of the hook in passing the point where the load is to be detached from the elevator, means for permitting the hook to pass the detaching member and means for operatively connecting the detaching member with the elevator so that it rises faster than the latter and lifts the hook therefrom by the free tongue referred to, substantially as set forth.

15. In a device for detaching loads from an elevator the combination of, a load-carrying elevator, a double hook suspended by one of its tongues from the elevator, the second tongue being situated on the opposite side to the first so that it projects away from the elevator, a load-carrying shank to the hook, a detaching member following in the path traversed by the free tongue of the hook in passing the point where the load is to be detached from the elevator and means for operatively connecting the detaching member with the elevator so that it rises faster than the latter and lifts the hook therefrom by the free tongue referred to, substantially as set forth.

16. In a device for detaching loads from an elevator the combination of, a load-carrying elevator, a double hook suspended by one of its tongues from the elevator the second tongue being situated on the opposite side to the first so that it projects away from the elevator, a load-carrying shank to the hook, a detaching member adapted to be reciprocated in the path traversed by the free tongue of the hook in passing the point where the load is to be detached from the elevator, means for permitting the hook to pass the detaching member, means for operatively connecting the detaching member with the elevator so that it rises faster than the latter and lifts the hook therefrom by the free tongue referred to, and means for disengaging the hook with its load from the detaching member, substantially as set forth.

17. In a device for detaching loads from an elevator the combination of, a load-carrying elevator, a double hook suspended by one of its tongues from the elevator, the second tongue being situated at the opposite side to the first so that it projects away from the elevator, a load-carrying shank to the hook, a detaching member following in the path traversed by the free tongue of the hook in passing the point where the load is to be detached from the elevator, means for operatively connecting the detaching member with the elevator so that it rises faster than the latter and lifts the hook therefrom by the free tongue referred to, a downwardly-inclined delivery-guide having its upper end situated near the detaching member, and means for disengaging the hook with its load from the detaching member and passing it on to the delivery-guide so that the hook carrying the load gravitates down the latter, substantially as set forth.

18. In a device for detaching loads from an elevator the combination of, a load-carrying elevator, a support near the point at which the loads are to be detached, a detaching-arm pivoted to the support so that its operative end is free to swing into and by continued movement out of the path of the load carried by the elevator, a movable member operatively connected with this arm in such manner that when displaced a given distance the free end of the arm will have traversed a greater distance, an outwardly-directed projection on the elevator adapted to displace this movable member as it passes and so set relatively to the load that the movable member is displaced at the moment the load is in the path through which the end of the detaching-arm travels resulting in the load being lifted thereby from the elevator, and means for returning the arm to a position out of the path of the loads carried by the elevator, substantially as set forth.

19. In a device for detaching loads from an elevator the combination of, a load-carrying elevator, a support near the point at which the loads are to be detached, a gravity-controlled detaching-arm pivoted to the support so that its operative end is free to swing into and by continued movement out of the path of the load carried by the elevator but normally pendent with its free end out of such path, a movable member operatively connected with this arm in such manner that when displaced a given distance the free end of the arm will have traversed a greater distance, and an outwardly-directed projection on the elevator adapted to displace this movable member as it passes and so set relatively to the load that the movable member is displaced at the moment the load is in the path through which the end of the detaching-arm travels resulting in the load being lifted thereby from the elevator until continued movement again releases the movable member and the detaching-arm returns under the action of gravity, substantially as set forth.

20. In a device for detaching loads from an elevator the combination of, a load-carrying elevator, a support near the point at which the loads are to be detached, a detaching-arm pivoted to the support so that its operative end is free to swing into and by continued movement out of the path of the load carried by the elevator, a movable member operatively connected with this arm in such manner that when displaced a given distance the free end of the arm will have traversed a greater distance, an outwardly-directed projection on the elevator adapted to displace this movable member as it passes and so set relatively to the load that the movable member is displaced at the moment the load is in the path through which the end of the detaching-arm travels resulting in the load being lifted thereby from the elevator, means to maintain the detaching-arm in its operative position until the load is discharged therefrom, means for discharging the load from the arm and means for returning the arm to a position out of the path of the loads carried by the elevator, substantially as set forth.

21. In a device for detaching loads from an elevator the combination of, a load-carrying elevator, a support near the point at which the loads are to be detached, a detaching-arm pivoted to the support so that its operative end is free to swing into and by continued movement out of the path of the load carried by the elevator, a member secured to the detaching-arm at a point between the free end and the pivoted end thereof and projecting toward the elevator, an outwardly-directed projection on the elevator adapted to engage this member as it passes and so set relatively to the load that the member is engaged at the moment the load is in the path through which the end of the detaching-arm travels resulting in the load being lifted thereby from the elevator, and means for returning the arm to a position out of the path of the loads carried by the elevator, substantially as set forth.

22. In a device for detaching loads from an elevator the combination of, a load-carrying elevator, a support near the point at which the loads are to be detached, a detaching-arm pivoted to the support so that its operative end is free to swing into and by continued movement out of the path of the load carried by the elevator, an outwardly-directed projection on the elevator, a striking member pivoted to the detaching-arm at a point between the free end and the pivoted end thereof and projecting toward and lying parallel to and in the same plane as the elevator and in the path of the projection thereon, means to control the movement of this plate so that when engaged by the projection parallel motion is imparted to it in a direction away from the elevator until the projection can pass the member being maintained in this position until the projection has traversed its face and means for returning the detaching-arm and connected member to their normal positions, substantially as set forth.

23. In a device for detaching loads from an elevator the combination of, a load-carrying elevator, a support near the point at which the loads are to be detached from the elevator, a detaching-arm pivoted to this support so that its operative end is free to swing into and by continued movement out of the path of the load carried by the elevator, mechanism operatively connecting the elevator with this arm so that its free end overtakes the elevator and lifts the load from the same, a projection on the elevator, a lever pivoted to the support referred to and extending into the path of this projection, means to maintain the detaching-arm in its lifted position until this lever is operated by the movement of the elevator, mechanism operatively connected with the lever to push the load from the detaching-arm, means for returning the arm after the discharge of the load to a position out of the path of the loads carried by the elevator and means for returning the lever for discharging the load, substantially as set forth.

24. In a device for detaching loads from an elevator the combination of, a load-carrying elevator, a support near the point at which the loads are to be detached from the elevator, a detaching-arm pivoted to this support so that its operative end is free to swing into and by continued movement out of the path of the load carried by the elevator, mechanism operatively connecting the elevator with this arm so that its free end overtakes the elevator and lifts the load from the same, an outwardly-directed projection on the elevator, a lever pivoted to the support referred to above and extending into the path of this projection, a discharging-lever pivoted to the support so that its free end can be swung across the operative end of the detaching-arm in a direction at right angles to the latter, means for operatively connecting this discharging-lever with the first-mentioned lever so that the discharging-lever may be operated as described, means to maintain the detaching-arm in its raised position until the first lever is operated by the movement of the elevator, means for returning the detaching-arm after such movement to a position out of the path of the loads carried by the elevator, and means for returning the discharging-lever, substantially as set forth.

25. In a device for detaching loads from an elevator the combination of, an elevator, an outwardly-directed projection on the same adapted to receive a hook to which the load is attached, and means for automatically lifting the hook from such projection at the point where the load is to be detached from the elevator, substantially as set forth.

26. In a device for detaching loads from an elevator the combination of, a chain elevator, an outwardly-projecting link on the same adapted to receive a hook to which the load is attached, means to prevent lateral displacement of the hook therefrom, and means for automatically lifting the hook from such projection at the point where the load is to be detached from the elevator, substantially as set forth.

27. In a device for detaching loads from an elevator, the combination of, a chain elevator, an outwardly-projecting link on the same, an upwardly and backwardly directed extension of the projecting portion of the link perforated to receive a hook to which the load is attached, means to prevent lateral displacement of the hook thereon, and means for automatically lifting the hook from such projection at the point where the load is to be detached from the elevator, substantially as set forth.

28. In a device for detaching loads from an elevator the combination of, a chain elevator, an outwardly-projecting link on the same adapted to receive a hook to which the load is attached, wheels to the link, a guideway for the wheels carried by the frame of the elevator, means to prevent lateral displacement of the hook from the link and means for automatically lifting the hook from the same at the point where the load is to be detached from the elevator, substantially as set forth.

29. In a device for detaching loads from an elevator the combination of, a load-carrying elevator, a frame adjustable to any point in the path of the carrying portion of the elevator, a delivery-guide, means for pivoting one end of the guide to the frame so that it can turn about a vertical and also a horizontal axis, and mechanism carried by the frame to discharge the load from the elevator onto the delivery-guide, substantially as set forth.

30. In a device for detaching loads from an elevator the combination of, a load-carrying elevator, a frame adjustable to any point in the path of the carrying portion of the elevator, a delivery-guide, a bracket, means for pivotally connecting the delivery-guide and bracket, means for pivotally connecting the bracket to the frame one of these pivots being vertical and the other horizontal, and mechanism carried by the frame to discharge the load from the elevator onto the delivery-guide, substantially as set forth.

31. In a device for detaching loads from an elevator the combination of, a hook on each load, a frame adjustable to any point in the path of the carrying portion of the elevator, mechanism carried by the frame and adapted to engage the hook on the load and lift the load thereby from the elevator, a guide-rail one end of which alines with the hook when lifted by the detaching mechanism while the other extends from the frame to the point at which the load is to be delivered, a support for this extending portion secured to the frame and pivoted to swing about a horizontal axis the rail being carried transversely through the horizontal axis and divided to permit the required movement and means for supporting that portion of the rail which lies between the detaching mechanism and the horizontal axis of the pivot, substantially as set forth.

32. In a device for detaching loads from an elevator the combination of, a hook on each load, a frame adjustable to any point in the path of the carrying portion of the elevator, mechanism carried by the frame and adapted to engage the hook on the load and lift the load thereby from the elevator, a guide-rail one end of which alines with the hook when lifted by the detaching mechanism while the other extends from the frame to the point at which the load is to be delivered, a support for this extending portion secured to the frame and pivoted to swing about a vertical and a horizontal axis the rail being carried transversely through the horizontal axis and vertically beneath the vertical axis and divided to permit the required movement, and means for securing that portion of the rail which lies between the detaching mechanism and the vertical line of the pivot, substantially as set forth.

33. In a device for detaching loads from an elevator the combination of, a hook on each load, a frame adjustable to any point in the path of the carrying portion of the elevator, mechanism carried by the frame and adapted to engage the hook on the load and lift the load thereby from the elevator, a guide-rail one end of which alines with the hook when lifted by the detaching mechanism while the other extends from the frame to the point at which the load is to be delivered, a support for this extending portion secured to the frame and pivoted to swing about a horizontal axis, the rail being carried transversely through the horizontal axis and divided to permit the required movement, means for securing the extending portion of the rail to one side of the support with clearance for the tongue of the hook on that side toward the support and for the shank and load on the other, a second rail extending similarly along the opposite side of the support, and a detachable rail-piece extending from one of said side rails to a point within the horizontal axis about which the support pivots and means for supporting that portion of the rail which lies between the detaching mechanism and the horizontal axis of the pivot, substantially as set forth.

34. In a device for detaching loads from an elevator the combination of, a hook on each load, a frame adjustable to any point in the path of the carrying portion of the elevator, mechanism carried by the frame and adapted to engage the hook on the load and lift the load thereby from the elevator, a guide-rail one end of which alines with the hook when lifted by the detaching mechanism while the other extends from the frame to the point at which the load is to be delivered, a support for this extending portion secured to the frame and pivoted to swing about a vertical and a horizontal axis, the rail being carried transversely through the horizontal axis and vertically beneath the vertical axis and divided to permit the required movement, means for securing the extending portion of the rail to one side of the support with clearance for the tongue of the hook on that side toward the support and for the shank and load on the other, a second rail extending similarly along the opposite side of the support, and a detachable rail-piece for connecting one of these side rails to that portion which lies vertically beneath the vertical pivot and means for supporting that portion of the rail which lies between the detaching mechanism and the vertical line of the pivot, substantially as set forth.

35. In a device for detaching loads from an elevator the combination of, a hook on each load, a frame adjustable to any point in the path of the carrying portion of the elevator, mechanism carried by the frame and adapted to engage the hook on the load and lift the load thereby from the elevator, a guide-rail one end of which alines with the hook when lifted by the detaching mechanism while the other extends from the frame to the point at which the load is to be delivered, a bracket pivoted about a vertical axis to the frame, a jaw at its base to permit the passage of the guide-rail, a support for the extension of the guide-rail, a jaw at one end of the support, means for pivoting this jaw about a horizontal axis to that on the bracket the guide-rail being carried transversely through this horizontal axis and beneath the vertical axis about which the bracket is pivoted and divided to permit the required movement, and means for securing that portion of the rail which lies between the detaching mechanism and the vertical line of the pivot, substantially as set forth.

36. In a device for detaching loads from an elevator the combination of, a hook on each load, a frame adjustable to any point in the path of the carrying portion of the elevator, mechanism carried by the frame and adapted to engage the hook on the load and lift the load thereby from the elevator, a guide-rail one end of which alines with the hook when lifted by the detaching mechanism while the other extends from the frame to the point at which the load is to be delivered, a support for this extending portion, means for pivoting this support to the frame about a horizontal axis, the rail being carried transversely through the horizontal axis and divided to permit the required movement, and similar means provided on the other side of the frame so that the support can be readily mounted on either side, substantially as set forth.

37. In a device for detaching loads from an elevator the combination of, a load-carrying elevator, a frame adjustable relatively to any point in the path of the carrying portion of the elevator, a downwardly-inclined delivery-guide pivotally attached to this frame, mechanism carried by the frame to discharge the load from the elevator onto the delivery-guide, and an extension guide-rail system to receive the load from the delivery-rail, substantially as set forth.

38. In a device such as described the combination with a load-carrying elevator, a frame, oppositely-inclined guide-rails carried by the frame mechanism carried by the frame to discharge the load from the elevator to one of said guide-rails, and a rail-piece for receiving the load so discharged; substantially as described.

39. In a device such as described, the combination with a load-carrying elevator, a frame, oppositely-inclined guide-rails carried by the frame mechanism carried by the frame to discharge the load from the elevator to either of said guide-rails, and a detachable rail-piece for receiving the load so discharged; substantially as described.

In testimony whereof we have signed our names to this specification in the presence of two subscribing witnesses.

GEORGE COLBY MACKROW.
HERBERT GEORGE CAMERON.

Witnesses:
ALFRED NUTTING,
H. D. JAMESON.